United States Patent Office 3,203,992
Patented Aug. 31, 1965

3,203,992
DERIVATIVES OF 1-(o-BROMOPHENOXY)-2-HYDROXY-3-AMINOPROPANE
Wilhelm Kunz and Haireddin Jacobi, Monheim, Rhineland, Germany, assignors to Sanol-Arzneimittel Dr. Schwarz G.m.b.H., Monheim, Germany, a corporation of Germany
No Drawing. Filed Jan. 25, 1963, Ser. No. 253,972
Claims priority, application Germany, Feb. 14, 1962,
S 78,034
5 Claims. (Cl. 260—570.7)

It is known that certain aryloxypropanolamines have antipyretic, analgetic and local anesthetic activity [(V. Petrow et al., J. Pharmacy Pharmacol. 8,666 (1956), Y. M. Beasley et al., P. Pharmacy Pharmacol, 10, 46 (1958)]. We have now found that specific compounds not previously reported have useful sedative properties.

These compounds have the following formula:

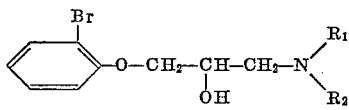

in which $R_1$ and $R_2$ are hydrogen, lower alkyl of 1 to 8 carbon atoms, hydroxy lower alkyl of from 2 to 8 carbon atoms, cycloalkyl, aryl, aralkyl or, when taken together with the nitrogen atoms, pyrrolidino, morpholino or tetrahydroisoquinolyl.

Preferred are the secondary amines in which $R_1$ is hydrogen and $R_2$ is lower alkyl of 1 to 8 carbon atoms.

Especially preferred is the compound in which $R_1$ is hydrogen and $R_2$ is tert. butyl.

The bases have utility as such in the form of their nontoxic salts with pharmaceutically acceptable acids such as hydrochloric, sulfuric, maleic, ethanedisulfonic etc. acids.

The compounds of this invention have been found to have a pure sedative activity rather than a biphased activity such as other sedatives have i.e., the barbiturates. This activity is realized when the compounds are combined in unit dosage form with a common pharmaceutical carrier such as lactose or magnesium sulfate. Such unit doses are then administered internally preferably orally several times daily to induce sedation.

It should be noted that 1-(o-bromophenoxy)-2-hydroxy-3-tert. butylaminopropane has an $ED_{50}$ in a common pharmacological test for sedatives, namely antagonizing the stimulating effects of methamphetamine, which shows it to be about 7 times as active as its n-butyl congener, 21 times as active as its isobutyl congener and over 100 times as active as meprobamate.

The compounds of this invention are prepared by common synthetic schemes known per se to the art such as reacting an o-bromophenylglycidic ether with an o-bromophenoxy-2-hydroxy-3-halopropane with an amine, alternatively o-bromophenol can be reacted with an aminopropylene oxide or an amino-3-halo-2-propanol. These and other methods of preparation are illustrated by the following examples.

Example 1

A mixture of 18.9 g. of o-bromophenylglycidic ether (the 2,3-oxidopropyl ether as prepared in British Pat. No. 622,297) and 5.0 g. of isopropylamine in 50 ml. of ethanol is heated at reflux for 6 hours. The solvent is removed. The residue is washed with water and extracted with benzene. The dried benzene extracts are saturated with dry hydrogen chloride to give 1-(o-bromophenoxy)-2-hydroxy-3-isopropylaminopropane hydrochloride, M.P. 124–126° C.

Example 2

A mixture of 17.5 g. of o-bromophenylglycidic ether and 5.3 g. of pyrrolidine in 75 ml. of ethanol is heated at reflux for 8 hours. The solvent is removed. The residue crystallizes upon standing to give 1-(o-bromophenoxy-2-hydroxy-3-pyrrolidinopropane, M.P. 76–79° C.

Example 3

A mixture of 1-(o-bromophenoxy)-2-hydroxy-3-tert. butylaminopropane (prepared as in Example 1) and 5.2 g. of ethyl iodide in 20 ml. of ethanol is heated under reflux for 2 hours. The alcohol is taken off in vacuo to leave an oily residue which is washed with water then separated. The oil is dissolved in dilute sulfuric acid, treated with sodium nitrite and extracted with ether. The tertiary base separates after treatment with alkali and is taken up in ether. The hydrochloride salt of the N-ethyl-N-tert. butyl congener is formed with dry hydrogen chloride gas, M.P. 144–146° C.

Example 4

Using the stock reactions above and molar equivalent amounts of similar reactants the following compounds are prepared.

| $\begin{array}{c}R_1\\N\\R_2\end{array}$ | Form | M.P. ° C. |
|---|---|---|
| —NH—$C_3H_7$ | HCl | 131–134 |
| —NH—$C_4H_9$ | HCl | 92–95 |
| —NH—iso—$C_4H_9$ | HCl | 130–132 |
| —NH tert.—$C_4H_9$ | Base | B.P. 142–145 @ 1 mm. |
|  | HCl | 150–151 |
|  | Maleate | 112–114 |
|  | Sulfate | 188–191 |
|  | Phosphate | 112–114 |
| —NH—$C_8H_{17}$ | HCl | 133–136 |
| —NH sec $C_8H_{17}$ | HCl | 104–106 |
| —NH—C($C_2H_5$)($C_2H_5$)—$C_3H_7$ | HCl | 158–160 |
| —NH—$CH_2CH=CH_2$ | HCl | 125–128 |
| —NH—C($CH_2OH$)($CH_2OH$)$CH_2CH_3$ | HCl | 122–124 |
| —NH—⟨S⟩ | HCl | 192–194 |
| —NH—⟨⟩ | HCl | 142–144 |
| —NH—$CH_2$—⟨⟩ | HCl | 140–143 |
| —N($CH_3$)$_2$ | Base | B.P. 134–139 @ 1 mm. |
|  | HCl | 110–112 |
| —N($C_2H_5$)$_2$ | HCl | 124–126 |
| —N—(iso $C_3H_7$)$_2$ | HCl | 172–174 |
| —N($C_4H_9$)$_2$ | HCl | 95–98 |
| —N⟨O⟩ | Base | 83–85 |
|  | HCl | 130–133 |
| —N (tetrahydroisoquinolyl) | HCl | 168–170 |

What is claimed is:
1. A compound of the formula:

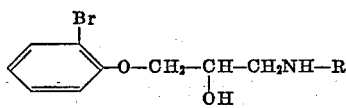

in which R is lower alkyl of from 1 to 8 carbon atoms.

2. A compound of the formula:

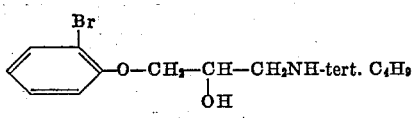

3. 1-(o-bromophenoxy)-2-hydroxy-3-tert. butylaminopropane hydrochloride.
4. 1-(o-bromophenoxy) - 2 - hydroxy-3-benzylaminopropane hydrochloride.
5. 1 - (o-bromophenoxy)-2-hydroxy-3-hydroxyloweralkylaminopropane.

References Cited by the Examiner

UNITED STATES PATENTS

| | | | |
|---|---|---|---|
| 2,967,201 | 1/61 | Soper | 260—570.7 |
| 3,033,640 | 5/62 | Hofer et al. | 260—570.7 |
| 3,083,139 | 3/63 | Aspergren et al. | 167—65 |
| 3,089,826 | 5/63 | Sahyun et al. | 167—65 |
| 3,105,854 | 10/63 | Druey et al. | 260—570.7 |

FOREIGN PATENTS 213,872  3/61  Austria.

OTHER REFERENCES

David et al.: "Jour. Pharm. and Pharmacol.," vol. 10, pp. 60–70 (1958).

Goodsell et al.: "Jour. Pharmacol. and Exptl. Therap.," vol. 110, pp. 251–9 (1954).

Beasley et al.: J. Pharmacy and Pharmacology, vol. 10, pp. 47–59, 1958.

CHARLES B. PARKER, Primary Examiner.

NICHOLAS S. RIZZO, Examiner.